United States Patent [19]
Ekblad et al.

[11] Patent Number: 5,920,478
[45] Date of Patent: Jul. 6, 1999

[54] MULTI-INPUT MULTI-OUTPUT GENERIC NON-INTERACTING CONTROLLER

[75] Inventors: Mark K. Ekblad, San Jose; Curtis F. Elia, San Carlos, both of Calif.

[73] Assignee: Oakleaf Engineering, Inc., Redwood City, Calif.

[21] Appl. No.: 08/884,254

[22] Filed: Jun. 27, 1997

[51] Int. Cl.⁶ .......................... G05B 13/02; G05B 13/04; G06F 17/10; H02P 1/00
[52] U.S. Cl. .......................... 364/149; 364/148; 364/151; 364/724.011; 364/724.06; 318/139; 455/179
[58] Field of Search .................................. 364/148, 149, 364/724.011, 724.06, 151; 318/139; 455/179

[56] References Cited

U.S. PATENT DOCUMENTS

| | | | |
|---|---|---|---|
| 4,334,323 | 6/1982 | Moore | 455/179 |
| 4,368,510 | 1/1983 | Anderson | 364/151 |
| 4,407,013 | 9/1983 | Arcara et al. | 364/149 |
| 4,769,766 | 9/1988 | Tung | 364/149 |
| 5,281,900 | 1/1994 | Park | 318/139 |
| 5,394,322 | 2/1995 | Hansen | 364/148 |
| 5,400,247 | 3/1995 | He | 364/148 |
| 5,682,309 | 10/1997 | Bartusiak et al. | 364/149 |
| 5,777,872 | 7/1998 | He | 364/149 |

*Primary Examiner*—William Grant
*Assistant Examiner*—Carolyn T. Baumgardner
*Attorney, Agent, or Firm*—Philip H. Albert; Townsend and Townsend and Crew

[57] ABSTRACT

A multi-input multi-output (MIMO) controller is configured as a generic, non-interacting, multivariable controller with adaptive capabilities. The controller transforms the coupled multivariable control problem to multiple decoupled single-input single-output loops. The decoupling occurs in the input/output map of the system being controlled. The transformed system can then be controlled using any control synthesis technique to meet the system performance objectives, such as Proportional plus Integral plus Derivative (PID) control. An empirical dynamic model is continually identified from on-line data. From this model, static decoupling transformations based on a singular value decomposition are determined and updated and the controller gains are calculated.

18 Claims, 3 Drawing Sheets

Fig. 4

MULTI-INPUT MULTI-OUTPUT GENERIC NON-INTERACTING CONTROLLER

BACKGROUND OF THE INVENTION

The present invention relates to the field of dynamic system control. More specifically, one embodiment of the invention allows for controlling systems with multiple, interacting inputs and outputs using non-interacting single-input single-output tunable controllers and techniques, while accounting for the interacting nature of the system being controlled and adapting to system variations.

Control systems are used in a wide variety of fields, such as industrial processes, environmental systems, electronic systems, and any other system where system output variables representing measurements and user specified desired outputs ("process variables") are processed to generate system input variables which control devices which change the system. A simple example of a control system is a heating and air conditioning ("H/AC") system. There, the controller inputs may be the temperatures of the rooms being controlled and a thermostat setting. The controller outputs may be air flow (volume/time), temperature of outgoing air, power setting of a compressor, etc. The goal of the control system is to regulate the temperature in each room being controlled to the thermostat setting for that room. If the rooms are not coupled (via open doors or the like), each room can be treated as a single-input (air flow) and single output (temperature) system. However, where the rooms are coupled, the control solution must be a multi-input multi-output controller to account for the interactions between rooms.

Fundamental to the use and effectiveness of any controller is its ability to regulate the process outputs of the system being controlled to reject disturbances, to maintain stability and performance specifications in the event of system variations, and to minimize the effort and time required for tuning the controller's performance. Tuning is the process of setting the controller's internal logic, circuitry and/or variables so that the controller's output signals cause the desired effect (of reaching the controller's goal) given the controller's inputs.

Single-input single-output (SISO) controllers are simpler to tune than MIMO controllers, but SISO controllers cannot account for control of processes with multiple interacting inputs and outputs. Multivariable control techniques can account for all the interactions between the process variables by utilizing a dynamic model of the process, but require a dynamic process model development and a non-generic, manual design, which cannot be generalized easily, for each multivariable process considered.

Detailed studies of multivariable feedback control design are found in J. Doyle et al., "Multivariable Feedback Design: Concepts for a Classical/Modern Synthesis," *IEEE Transactions on Automatic Control*, vol. AC-26, No. 1 (February 1981), J. Maciejowski, *Multivariable Feedback Design*, Addison-Wesley (England 1989) (hereinafter "Maciejowski") and K. Ogata, *Discrete-Time Control Systems*, Prentice-Hall (New Jersey 1987) (hereinafter "Ogata"). These references are incorporated herein by reference for all purposes.

The types of control synthesis techniques described in those references are "model-based" techniques in that they rely on a dynamic model to shape cost functionals or a magnitude curve to achieve certain performance objectives. The model-based synthesis process requires an in-depth knowledge of these techniques and significant numerical computation, a consequently it does not lend itself to easy on-line tuning. The necessary calculations are quite involved, are not always numerically stable or robust, and may not be feasible in all cases to implement on-line. Although these model-based techniques are powerful tools for synthesizing control algorithms and can achieve excellent performance on many applications, they are not suited to be made into a generic, easily tunable structure which can be designed without being limited to a particular example of a controlled system or a system known in advance. Model-based techniques are more suited for custom designs by those with significant skill in designing control systems.

One approach which partially solves the foregoing problems is the use of the Inverse Nyquist Array (INA) and Characteristic Loci (CL) methodologies. For a detailed description of these methodologies, see Maciejowski. Those methodologies are multivariable generalizations of the SISO Nyquist theory and root-locus design techniques which attempt to transform a coupled process into smaller design problems, but those methodologies are still complex to use and understand. Both INA and CL require a process model and in most cases must be used off-line (i.e., cannot be used in real-time). INA and CL attempt, with pre-compensation and post-compensation, to achieve a diagonally dominant system over the entire frequency range of the system. This leads to difficulties in the realization of the controller; it cannot be physically realized or built because it violates causality (i.e., it depends on signals before the signals exist.) With INA and CL techniques, as with the other model-based techniques previously mentioned, there is no direct way to tune the controller's performance on-line. Another limitation of INA and CL is that, while they do allow for the design of scalar problems, they concentrate on SISO reliability (robustness), to the detriment of MIMO reliability.

From the above it is seen that a gap exists between easily tunable, non-interacting SISO control techniques and interacting, difficult to tune MIMO techniques, resulting in dichotomies in use and performance. What is needed is a non-interacting dynamic controller which accounts for the interactions in a MIMO dynamic process.

SUMMARY OF THE INVENTION

An improved dynamic controller is provided by virtue of the present invention. In one embodiment, dynamic model development is automated and the MIMO process is decoupled into a set of non-interacting SISO processes, so that simple SISO tuning techniques can be used in a tunable controller, while still accounting for complex interactions between process variables as is done in a multivariable controller. The invention allows an arbitrary size dynamic process with multiple inputs and multiple outputs to be controlled in a generic, adaptive SISO framework, using a dynamic model and transformations derived from the dynamic model to decouple the interactions of the MIMO process. The dynamic model is derived from on-line data using a conventional identification technique, such as an auto-regressive external-input (ARX) model combined with a least-squares estimation for parameter identification. Other standard techniques may be used in combination with the present invention to accomplish this system identification.

According to one aspect of the present invention, transformations are derived from the dynamic model which decouple the process at the steady-state, or direct current (DC), condition of the system. This transformation isolates the most controllable and observable parts of the system and accounts for their interactions, thereby accounting for MIMO reliability. The calculations used to derive the transformations are based upon stable and robust numerical methods which are well known and tested. Once the system is transformed, a generic SISO control structure, such as a "Proportional plus Integral plus Derivative" (PID) control can be tuned by a user or machine either individually or in unison through any technique, such as with the use of a Graphical User Interface (GUI), or in an automated fashion hidden from the user. Other standard control design techniques and structures may be used on the transformed system to accomplish this and are well known.

The invention will be understood better by referring to the following detailed description in connection with the accompanying drawings.

DESCRIPTION OF THE PREFERRED EMBODIMENTS

The apparatus described herein, a MIMO generic non-interacting controller, enables the decoupling of a complex interacting dynamic process into non-interacting processes controllable by a set of SISO subsystems. This allows the ease of tuning and implementation characteristic of a SISO controller to be used with a MIMO process, while utilizing the information about the interactions to improve the performance of the controller over that of applying SISO techniques independently.

The embodiment described herein comprises several computational components. A control design engine identifies a dynamic process model by collecting on-line data and identifying an ARX-type model recursively over the desired response specified by the user. The identification can also be done off-line if another synthesis technique is utilized and is not limited by the identification technique. The DC gain of the process model is used to calculate the decoupling transformations, which are based on a Singular Value Decomposition (SVD) of the DC gain. The singular values and the dominate time constants derived from the process model are used to calculate the controller gains.

Figure 1:
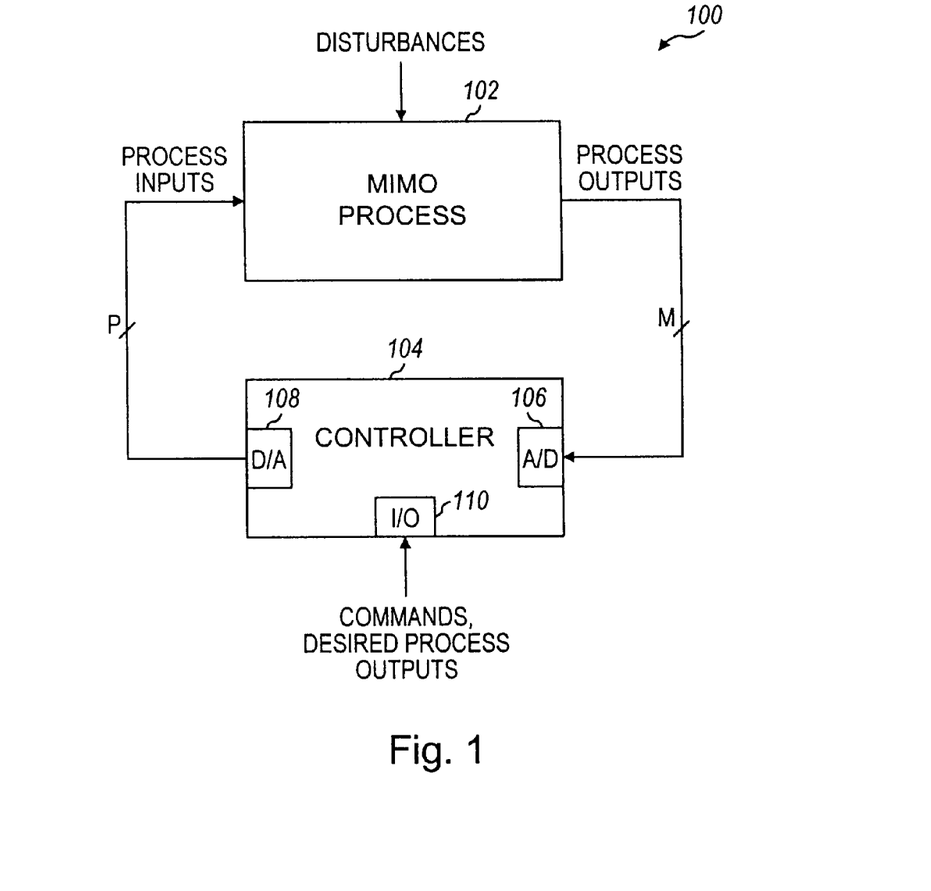
FIG. 1 is a block diagram of a MIMO dynamic process which is controlled by a control system according to one embodiment of the present invention.

FIG. 1 is a block diagram of the preferred embodiment of the present invention, showing a control system 100 in which a MIMO process 102 with external disturbances is controlled by a controller 104. Many different applications of the present invention are known and can be used in any environment where a process has measurable process outputs and input process controls. With the present invention, MIMO process 102 can be modeled to take into account effects of the inputs from controller 104. In the preferred embodiment, controller 104 is implemented as a digital control system, but analog control systems might also be used where appropriate.

Controller 104 accepts M process variable outputs from MIMO process 102 and provides P process inputs to MIMO process 102. If the outputs are analog signals, as is often the case, an M-channel analog-to-digital converter 106 is included in controller 104 to digitize the output signals. Likewise, if the process inputs are analog signals, a P-channel digital-to-analog converter 106 is included to convert the digital outputs of controller 104 into analog signals. Controller 104 also accepts external commands and desired process outputs ("references") from a reference or command generator, or other similar device. If these external commands are analog signals, they are digitized for use by controller 104 by a suitable I/O device 110. The particular commands are dependent on the system being controlled. For example, if the system being controlled is a H/AC system in a home, the commands might be limited to "turn on", "turn off" and the desired process output might be a desired temperature of a given room. Where a more complex process is being controlled, such as a chemical mixing process, the commands might come from a graphical user interface (GUI) or even another automated computing process.

Regardless of how the overall system is arranged, the role of controller 104 remains the same, namely to control MIMO process 102 via the process inputs according to commands and references input to controller 104 to arrive at the desired process output variables.

Figure 2:
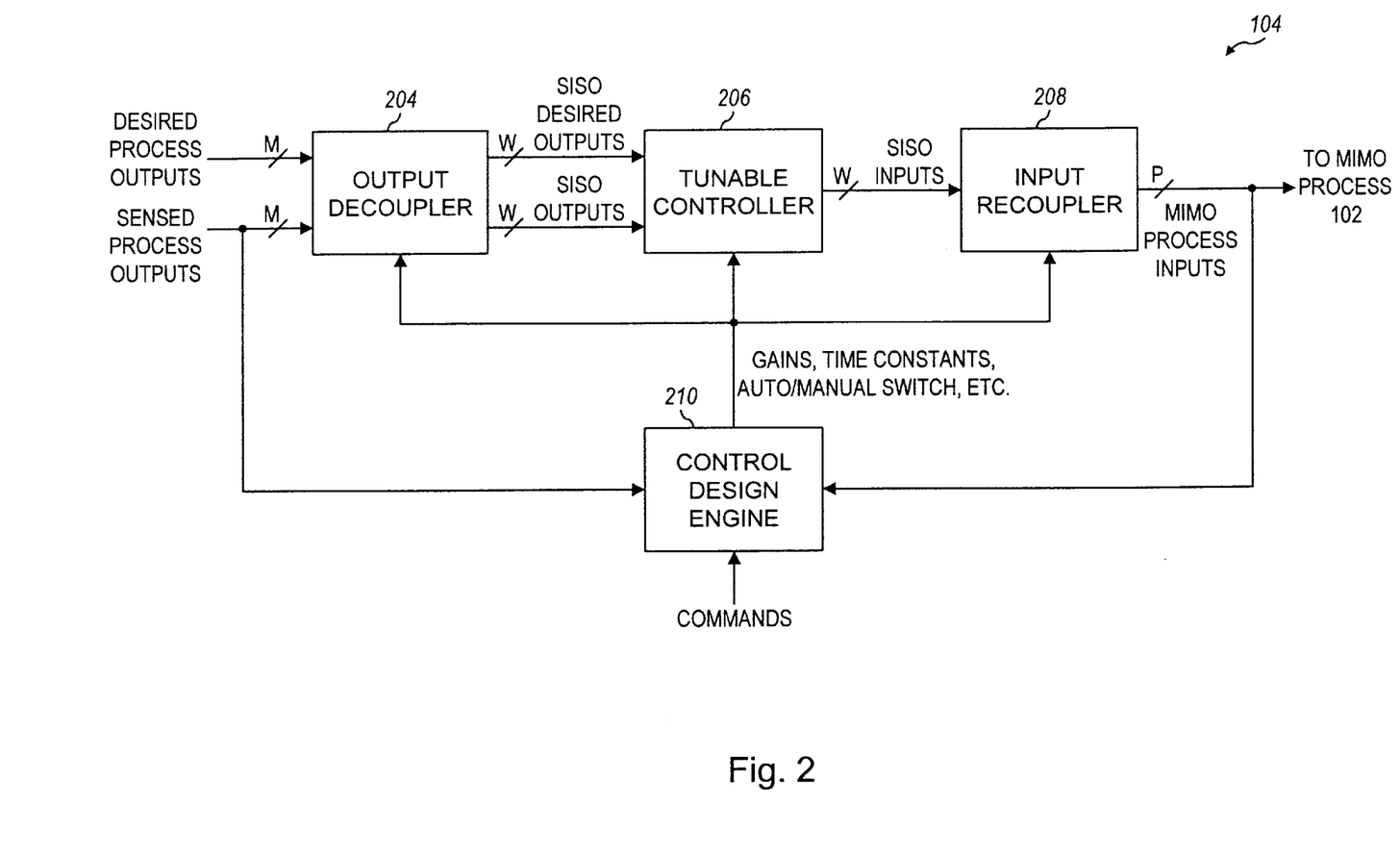
FIG. 2 is a block diagram of the preferred embodiment of the control system showing interacting components.

Referring now to FIG. 2, controller 104 is shown there in greater detail, illustrating how the inputs and outputs of MIMO process 102 are decoupled for control purposes. Controller 104 is shown comprising an output decoupler 204, a tunable controller 206, an input recoupler 208, and a control design engine 210. Each of these elements in this example are digital elements. The digital elements are implemented as digital circuits, programming modules of a digital signal processor, program routines used with a general purpose central processing unit, or a combination of more than one of these, depending on engineering constraints and design criteria. They will be described herein as digital circuits, although in many applications, they will be implemented by programming a microprocessor or microcontroller system (not shown).

Output decoupler 204 is responsive to receive the M sensed process outputs from the MIMO process (see FIG. 1, MIMO process 102) being controlled and M desired output values from a source external to controller 104 as described above. Here, M is assumed to be a number greater than one. Although controller 104 will work acceptably well with M=1, that case does not require decoupling. Generally, P is less than or equal to M, but the present invention will also work with P greater than M, with the understanding that at most M of the P signals will be independent.

The output decoupler 204 decouples the M sensed and desired process output signals into W SISO-equivalent signals, which in turn are input to tunable controller 206. Output decoupler 204 transforms the W MIMO process signals into W independent signals which tunable controller 206 uses to generate W suitable SISO-equivalent input signals. Tunable controller 206 outputs those W SISO-equivalent input signals to input recoupler 208, which outputs P MIMO process inputs to MIMO process 102 (see FIG. 1).

The W signals into tunable controller 206 and the W signals out of tunable controller 206 are independent in that only one element of the W input signals changes when one element of the W signals input to tunable controller 206 is changed. Thus, tunable controller 206 can operate as a set of W single channel controllers. Because of this attribute of the W signals, each of the W input pairs of signals can be processed by a SISO controller. As explained above, in a SISO process, one output signal is used to adjust one input signal of the SISO process to cause the output signal to match a desired value. This independence is possible because output decoupler 204 is configured to decouple the M MIMO process output signals into the W independent SISO-equivalent signals, thereby decoupling the independent controls from the multiple outputs they might affect. Of course, where desired, some of the W signals might be left in dependent (interacting) form to be controlled as a smaller MIMO controller within the larger MIMO system. Tunable controller 206 is also independent of the particular system being controlled. This provides the benefit of being able to use a generic controller for many different applications.

Input recoupler 208 is a recoupler in that more than one of the W SISO-equivalent input signals might be required to effect a given change in one of the P MIMO process inputs.

In addition to the above-described inputs, each of output decoupler 204, tunable controller 206 and input recoupler 208 receive parameter values from control design engine 210. The parameters are used in the process performed by each of these elements, as described below. Control design engine 210 receives as inputs the P MIMO process inputs which are output by input recoupler 208, the M process outputs output by MIMO process 102 and external commands.

Figure 3:
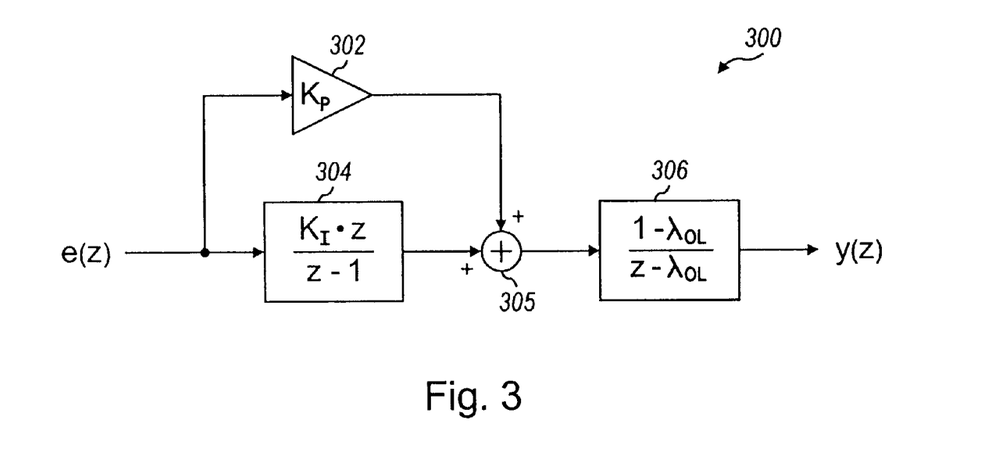
FIG. 3 is a block diagram of a positional form implementation of a Proportional Integral (PI) controller, as might be use for a single channel in the tunable controller shown in FIG. 2.

In operation, output decoupler 204 decouples the M MIMO sensed and desired process output signals into W SISO-equivalent signals, which are manipulated by tunable controller 206 using conventional control synthesis techniques as would be used to control W independent SISO processes. FIG. 3 shows an example of a circuit usable for such SISO control. The W SISO-equivalent input signals are transformed by input recoupler 208 into the P MIMO input process signals input to MIMO process 102. The operation of output decoupler 204, tunable controller 206 and input recoupler 208 is controlled by the variables and commands provided by control design engine 210. During testing modes, control design engine 210 outputs on and off commands, as well as specifying manual inputs and/or manual desired outputs.

Each of the components shown in FIG. 2 are described below in greater detail, some with reference to other figures.

Control Design Engine 210

The function of control design engine 210 is to: 1) command tests to facilitate dynamic process model development, 2) utilize test data to identify a dynamic process model, and 3) extract parameters from the identified model, such as its DC gain, singular value decomposition, and dominant process time constants. Upon initialization of controller 104, control design engine 210 executes tests on MIMO process 102 by providing test input command signals to output decoupler 204, tunable controller 206, and input recoupler 208 according to conventional testing procedures. In a typical test, either the MIMO process inputs for an open-loop test or the MIMO process outputs for a closed-loop test are held fixed at user-defined levels and control design engine 210 forces a step change to each of the P MIMO process inputs for an open-loop test or the M MIMO process outputs for a closed-loop test. Control design engine 210 monitors the response of MIMO process 102 to the step changes, selects the appropriate step magnitude based on user-defined levels, and selects the data sample rate and data length based on frequency content. It then commands tests using the selected step magnitude, sample rate, and data length for the output decoupler 204, tunable controller 206 and input recoupler 208 to implement. The test results are used to determine a dynamic process model (DPM). Depending on the needs of the process, the DPM might be parameterized by a gain and a time constant, a gain, time constant and a delay, a gain, time constant and delay which are variable functions of process outputs or other variables, or any other DPM which might be needed to model the process. From the identified DPM, control design engine 210 1) estimates a static DC gain matrix, 2) computes the gain matrix's singular value decomposition (SVD), and 3) computes the process time constants. Control design engine 210 provides these various values to output decoupler 204, tunable controller 206, and input recoupler 208.

To identify a dynamic process model (DPM), any number of standard techniques may be used, such as those shown in Ljung (L. Ljung, *System Identification: Theory for the User*, Prentice-Hall, New Jersey (1987); hereinafter "Ljung") and Mendel (J. Mendel, *Lessons in Digital Estimation Theory*, Prentice-Hall, New Jersey (1987)). The identification can be accomplished using Least-Squares Estimation (LSE) and ARX models. As shown by those references, which are incorporated herein for all purposes, a linear difference equation representation for an ARX model is as shown in Equation 1 where $A_i$ and $B_i$ are the adjustable parameters of the system and e(t) is the error.

$$y(t)+A_1 y(t-1)+ \ldots +A_{na}y(t-na)=B_0 u(t)+B_1 u(t-1)+ \ldots +B_{nb}u(t-nb)+e(t) \qquad \text{Equ. 1}$$

Assuming an input sequence u(0), u(1), . . . ,u(N) and a corresponding process output sequence y(0),y(1), . . . ,y(N) are completely known and defining a model parameter θ as shown in Equation 2, the predictor equation shown as Equation 3 can be used to determine the predicted output, $\hat{y}(t|\theta)$, at time t with a model based on upon θ, where Φ(t) is the regression vector as defined in Equation 4, where $n_a$ is the number of delays used with the sensed outputs and $n_b$ is the number of delays used with the test input.

$$\theta = [A_1 A_2 \ldots A_{na} B_1 B_2 \ldots B_{nb}]^T \qquad \text{Equ. 2}$$

$$\hat{y}(t|\theta) = \phi^T(t)\Theta \qquad \text{Equ. 3}$$

$$\phi(t) = [-y(t-1)-y(t-2) \ldots -y(t-n_a) u(t-1) \ldots u(t-n_b)]^T \qquad \text{Equ. 4}$$

The prediction error, e(t,θ) is the difference between the actual output y(t) and the estimated (predicted) output, $\hat{y}(t|\theta)$, as shown in Equation 5.

$$e(t,\theta) = y(t) - \phi^T(t)\theta \qquad \text{Equ. 5}$$

Determining the θ which minimizes the prediction error e(t,θ) can be done by minimizing the variance $V_N(\theta, Z^N)$ of the prediction error (defined in Equation 6).

$$V_N(\theta, Z^N) = \frac{1}{N}\sum_{t=1}^{N} \frac{1}{2}[y(t) - \varphi^T(t)\theta]^2 \qquad \text{Equ. 6}$$

In Equation 6, $Z^N$ is a set of ordered pairs of collected data, such as [u(0),y(0),u(1),y(1), . . . , u(N),y(N)]. The function $V_N(\theta, Z^N)$ is a well-defined linear scalar function of the model parameter θ. The least-squares criterion of $V_N(\theta, Z^N)$ set out in Equation 6 can be solved analytically, resulting in the value for the model parameter shown in Equation 7.

$$\hat{\theta}_N^{LS} = \left[ \frac{1}{N} \sum_{t=1}^{N} \varphi(t)\varphi^T(t) \right]^{-1} \frac{1}{N} \sum_{t=1}^{N} \varphi(t)y(t) \qquad \text{Equ. 7}$$

Where q is $n_a+n_b$, it can be shown that the q-by-q matrix R(N) defined in Equation 8 and the q-dimensional column vector f(N) defined in Equation 9 correspond to the covariance estimates of the collected historic data.

$$R(N) = \frac{1}{N} \sum_{t=1}^{N} \varphi(t)\varphi^T(t) \qquad \text{Equ. 8}$$

$$f(N) = \frac{1}{N} \sum_{t=1}^{N} \varphi(t)y(t) \qquad \text{Equ. 9}$$

The LSE can be computed using the correlation and crosscorrelation of the historic data. Note that if N (the number of pairs of collected data) is greater than q (the sum of the input delays used and the output delays used), the result is an over-determined system. In such cases, a Moore-Penrose inverse or pseudo-inverse of R(N) must be computed.

Using a companion canonical form, the LSE parameter estimates of the DPM can be realized by a discrete time Linear Time-Invariant (LTI) state-space representation such as shown in Equations 10 and 11.

$$x_{k+1} = Ax_k + Bu_k \qquad \text{Equ. 10}$$

$$y_k = Cx_k + Du_k \qquad \text{Equ. 11}$$

where, $x_k$ is an n-by-1 state vector, $y_k$ is an m-by-1 output vector, A is an n-by-n state dynamics matrix, B is an n-by-p input distribution matrix, C is an m-by-n output matrix, and D is an m-by-p output distribution matrix. Taking the z-transform of the representation shown in Equations 10 and 11 yields the gain G(z) shown in Equation 12.

$$G(z) = C(zI-A)^{-1}B+D \qquad \text{Equ. 12}$$

The DC gain (z=1) is shown in Equation 13, $$G(z=1) = DC \text{ gain} = C(I-A)^{-1}B+D = U\Sigma V^T \qquad \text{Equ. 13}$$

and is calculated using the Singular Value Decomposition (SVD), where E contains the singular values, and U and V contain the left and right singular vectors respectively. SVD is a conventional method of matrix decomposition as shown by G. Golub, et al., *Matrix Computations*, The Johns Hopkins University Press (Boston 1996), which is incorporated herein for all purposes. Once the DC gain is calculated, its SVD is computed and stored for later use.

The process time constants are determined by control design engine 210 by one of several methods known to one of ordinary skill in the art, such as using residues, cross-over frequency from a bode magnitude plot, or least-squares using a first order model.

Output Decoupler 204/Input Recoupler 208

The function of decoupler 204 and recoupler 208 is to decouple and recouple the MIMO process variables based on the DC gain of the process. While the preferred embodiment uses the DC gain in the decoupling static transformation, gains at other frequencies, such as at the cross-over frequency or other frequency, can be used instead. However, the DC gain is preferred because it can be estimated with the most reliability and for most processes steady-state decoupling is more beneficial than transient decoupling. Of course, where this is not the case, the gain at another frequency might be preferred.

Output decoupler 204 uses the SVD of the DC gain estimate provided by control design engine 210 to obtain a transformation to decouple the M MIMO process signals into the W SISO-equivalent process signals, while input recoupler 208 uses the SVD to obtain a transformation to recouple the W SISO-equivalent process inputs into the P MIMO process inputs.

The transformations performed by output decoupler 204 and input recoupler 208 result in a system with unity DC gain and approximately decoupled input/output mappings. The transformation is such that the W input/output signal pairs (into and out of tunable controller 206) are ordered from the most influential to the least influential.

The process DC gain can be expressed by its SVD in Equation 14. Introducing new input/output pair coordinates given by Equations 15 and 16, and substituting the new coordinates into the relation y=(DC gain)u, gives at steady state y*=Iu*, where I is the identity matrix, as expressed by Equation 17.

$$DC \text{ gain} = U\Sigma V^T \qquad \text{Equ. 14}$$

$$u = V(\Sigma^{1/2})^{-1}u^* \qquad \text{Equ. 15}$$

$$y^* = (\Sigma^{1/2})^{-1}U^T y \qquad \text{Equ. 16}$$

$$y^* = (\Sigma^{1/2})^{-1}U^T(DC \text{ gain})V(\Sigma^{1/2})^{-1}u^* = Iu^* \qquad \text{Equ. 17}$$

Thus, static decoupling is achieved with transformations that are essentially all-pass filters. The decoupling occurs over a larger frequency range than just at DC.

In the above equations, the transformation represented by the matrix $\Sigma^{-1}$ is divided between decoupler 204 and recoupler 208, each of which performs a $\Sigma^{1/2}$ transformation. More specifically, output decoupler 204 performs the transformation $\Sigma^{-1/2}U^T$ and input recoupler 208 performs the transformation $V\Sigma^{-1/2}$ for a combined transformation of $V\Sigma^{-1}U^T$. This is referred to as the "indirect" method of control, in that the variables controlled at tunable controller 206 are not necessarily representative of any physical quantity (due to the transformation at output decoupler 204). The indirect method is more appropriate for homogenous processes (i.e., where the multiple inputs and outputs relate to the same type of controlled variables and command trajectories) and where user interaction is to be kept at a minimum.

Where the MIMO process is heterogeneous or individual tuning of each loop is desired, a "direct" method might be more preferred. In the direct method, the output decoupler 204 transforms signals according to the identity matrix and input recoupler 208 transforms signals according to the transformation $V\Sigma^{-1}U^T$. In the direct method, the variables to be controlled still retain their physical meaning, since they are not transformed prior to tunable controller 206. In the direct method, M=W (see FIG. 2), while M and W might be different using the indirect method.

Tunable Controller 206

Tunable controller 206 uses the process time constant estimate and the singular values (from the SVD) of the DC gain estimate produced by control design engine 210 to compute controller gains of the W SISO-equivalent processes. Once the M process signals have been transformed into the W SISO-equivalent signals, conventional control synthesis techniques can be used within tunable controller 206 to control the MIMO process, since the signals manipulated by tunable controller 206 have been decoupled.

To create a generic structure understood in practice, a PID (Proportional plus Integral plus Derivative) controller can be used. The PID gains can be calculated using several methods. One benefit of using the SVD decoupling transformations is that it enables development of a method for automatic generation of a PID controller, thus allowing a MIMO system to be controlled by a framework of W standard SISO PID elements. The PID framework developed can be automated so there is no user interaction or it can be implemented so that the user can tune each loop independently. The following description uses a Proportional plus Integral (PI) controller, and one of ordinary skill in the art will recognize from this description how to modify the example to accommodate a PID controller.

The automated PI framework within tunable controller 206 uses the process time constants estimated and provided by control design engine 210. If $\lambda$ is the slowest dominant time constant identified for the MIMO process using one of the methods previously mentioned, a more conservative time constant value, $\lambda_{ol}$, should be used in practice for stability and robustness. In one embodiment, $\lambda_{ol}$ is based on a safety factor, SF, and is set equal to $\lambda$ unless $\lambda^*(SF)$ is less than or equal to 1.0, in which case, $\lambda_{ol}$ is set to $\lambda^*(SF)$. The safety factor is a number greater than one and a number which allows the zero from the PI implementation to be an attractor for the integrator time constant in the PI control law. This keeps the closed-loop time constants on the real axis given a stable minimum phase process. From experience, a typical value for a safety factor is 1.0001.

Referring now to FIG. 3, the SISO-equivalent model of one of the W loops controlled by tunable controller 206 is presented. The circuit shown is a positional form PI 300, as defined in Ogata. The proportional gain component of PI 300 is provided by an element 302 providing a gain of $K_P$ and the integral gain is provided by an element 304 having a gain of $K_I$. The input error signal, e(z), is applied to elements 302, 304 and their outputs are summed by a summer 305 and applied to the modeled process 306 (a first-order dynamic process model). The first-order process model results could be extended to higher orders, as will be apparent from this description.

For the purposes of analysis, the process model is assumed to be $(1-\lambda_{ol})/(z-\lambda_{ol})$, resulting in the open-loop overall loop transfer function shown by Equation 18. The desired closed-loop transfer function for this PI 300 is a first-order response with unity DC gain and given by Equation 19, where $\lambda_{cl}$ is the desired closed-loop time constant. This value can be specified by the user or can be automatically calculated based upon stability considerations. Equation 20 needs to be satisfied in the feedforward loop to achieve a first order closed-loop response.

$$y(z) = \left[\frac{(K_P + K_I)z - K_P}{z - 1}\right]\frac{1 - \lambda_{ol}}{z - \lambda_{ol}}e(z) \quad \text{Equ. 18}$$

$$y(z) = \frac{1 - \lambda_{cl}}{z - \lambda_{cl}} \quad \text{Equ. 19}$$

$$y(z) = \frac{1 - \lambda_{cl}}{z - 1}e(z) \quad \text{Equ. 20}$$

Solving for the PI gains $K_P$ and $K_I$ using Equations 18 and 19 results in the values shown in Equations 21 and 22.

$$K_P = (1 - \lambda_{cl})\frac{\lambda_{ol}}{1 - \lambda_{ol}} \quad \text{Equ. 21}$$

$$K_I = 1 - \lambda_{cl} \quad \text{Equ. 22}$$

These relationships hold for each of the W loops. Therefore, the $K_P$ and $K_I$ gain matrices can be constructed using these relationships for the diagonal elements of the respective matrices with the off-diagonal elements set to zero. It is interesting to note that the ratio of $K_P/K_I$ remains constant as the closed-loop time constant is increased to speed up the system's response. However, caution must be exercised if the process model is a Type 1 system, i.e., has an integrator as one of its states, as the resulting proportional gain, $K_P$, would be infinite.

The above PI 300 can be independently controlled apart from the other W–1 such controllers in tunable controller 206. If single parameter tuning is desired, the single values for the PI gains $K_P$ and $K_I$ can be determined from Equations 23 and 24, $$K_P = \frac{\alpha \sum_{DC}}{\sum_{DC}(1,1)} \quad \text{Equ. 23}$$

$$K_I = K_P\frac{1 - \lambda_{ol}}{\lambda_{ol}} \quad \text{Equ. 24}$$

where $\alpha$ is a speed response factor specified by the user or calculated internally, $\lambda_{ol}$ is the slowest dominant time constant over all the channels, $\Sigma_{DC}$ is the matrix of singular values from a SVD of the DC gain matrix identified for the process by control design engine 210, and $\Sigma_{DC}(1,1)$ is the largest singular value of the DC gain matrix.

The speed response factor, $\alpha$, can be a scalar or a diagonal matrix with different values for each of the W channels. These gains still yield the same ratio of $K_P/K_I$ as those above, namely $\lambda_{ol}/(1-\lambda_{ol})$, but have some definite advantages. For one, the proportional gain $K_P$ can be chosen so that more control authority is given to the actuator which has the most affect on the process, i.e., the channel with the largest singular value. As the singular values approach one another, the system is less coupled, and the proportional gain will approach the identity matrix, which is the desired result.

Another advantage is that the time response of the system can be specified through one constant, $\alpha$. For complete automation, $\alpha$ can be calculated internally as a scalar quantity, by calculating the MIMO gain margin of the system and setting a equal to 75% (or some other suitable factor) of the margin. Other values can be used, allowing more or less aggressive control; however, this is a conservative choice to allow the methods described above to be applied to a generic process with some inherent safety margins. If the process is of Type 1, the integral gain $K_I$ will be zero for that channel, which is the desired result.

Alternative control realizations can be used for the tunable controller 206, e.g. a velocity form PI as defined by Ogata can be implemented and similar relationships to Equations 23 and 24 can be derived by one of ordinary skill in the art using the teachings herein.

For single parameter tuning for a velocity form PI, the values for the PI gains are given by Equations 28 and 29, $$K_P = \Lambda_{ol}(I - \Lambda_{ol})^{-1} \qquad \text{Equ. 25}$$

$$K_I = \frac{\alpha \sum_{DC}}{\sum_{DC}(1,1)} \qquad \text{Equ. 26}$$

where $\alpha$ is a speed response factor specified by the user or calculated internally, $\Lambda_{ol}$ is a diagonal matrix with the diagonal entries equal to the dominant time constants of the process, $\Sigma_{DC}$ is the matrix of singular values from a SVD of the DC gain matrix identified for the process by control design engine 210, and $\Sigma_{DC}(1,1)$ is the largest singular value of the DC gain matrix. The speed response factor, $\alpha$, can be a scalar or a diagonal matrix with different values for each channel, as described previously.

Figure 4:
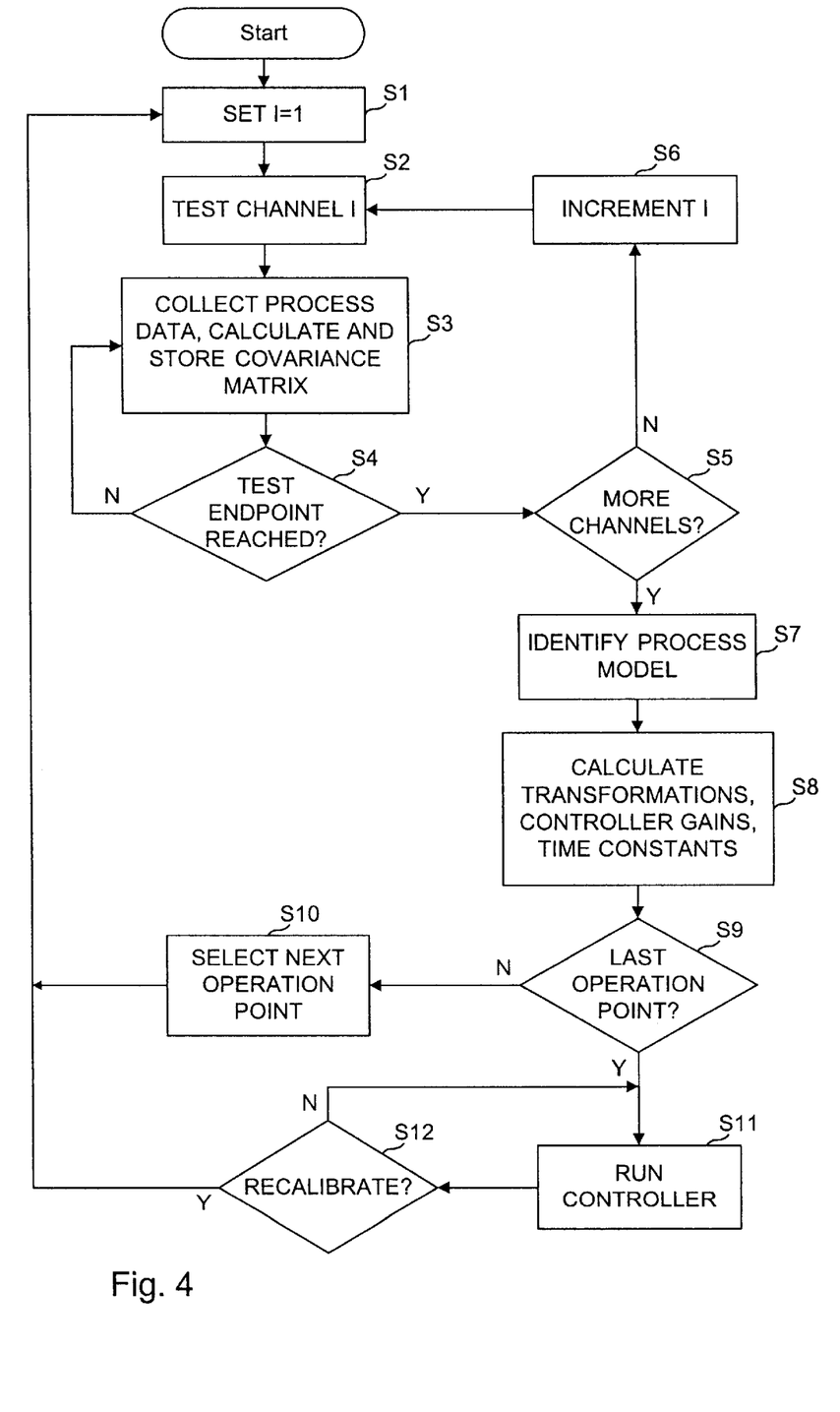
FIG. 4 is a flow chart of a computational process according to one embodiment of the present invention.

Referring now to FIG. 4, a flow chart of a process for operating a controller such as controller 104 is there shown. The process can be made into an adaptive process by updating the process model with new historic data and then updating the transformations and tunable controller channel gains. If the system's behavior is highly non-linear and a large operating envelope is required, all the required parameters can be scheduled with respect to the operating condition.

In a first step (S1), the control design engine 210 is initialized and a loop variable, i, is set to 1. Next (S2), the i-th input or output of the MIMO process is tested by the test commanded by control design engine 210. The control design engine 210 collects process data and calculates and stores a covariance matrix for the input or output (S3) as described above in connection with Equations 8 and 9. This continues, with a periodic check (S4) of whether or not a test endpoint has been reached as determined by the step magnitude and data length determined by the control design engine 210. Once the test endpoint for that input or output is reached, and more inputs or outputs await testing (S5), the loop variable, i, is incremented (S6) and the flow loops back to step S2 for testing the next input or output.

If no inputs or outputs remain to be tested, flow passes from step S5 to step S7, where control design engine 210 identifies the process model and calculates the decoupling transformations and tunable controller gains (S8). Following step S8, the results obtained by the control design engine are provided to the output decoupler, tunable controller, and input recoupler (unless they already have access to the values in a shared memory or the like). If multiple operation points are scheduled, a check is made (S9) to determine if all operation points have been tested. If not, the next operation point is selected (S10) and the flow loops back to step Si.

Otherwise, closed-loop control execution initiates (S11) with the calculated values of transformations and controller gains. During closed-loop execution, historic data of the control actions and process response is used to update the process model and corresponding values of transformations and controller gains, allowing adaptive updating and recalibration of the controller to process variations (S12) as needed.

The above description is illustrative and not restrictive. Many variations of the invention will become apparent to those of skill in the art upon review of this disclosure. Merely by way of example, embodiments of the present invention could be implemented using discrete circuits, firmware, software, or a combination of these. Also, while one example of a SISO controller was shown, a PI controller, the invention is not limited to that type of controller. For example, PD, PID or other forms of controllers could be used instead. In another example of the variations to which the present invention might be described, a partially interacting tunable controller might be used. A partially interacting tunable controller is used where it is preferred to couple some of the W SISO controllers so that those coupled inputs and outputs are interacting.

The scope of the invention should, therefore, be determined not with reference to the above description, but instead should be determined with reference to the appended claims along with their full scope of equivalents.

What is claimed is:

1. A controller for controlling a plurality of controllable inputs to a dynamic process where the plurality of controllable inputs affect a plurality of process outputs of the dynamic process and control of the plurality of process outputs is achieved by manipulating one or more of the plurality of controllable inputs to the dynamic process, the controller comprising:

a parameter calculator which calculates a plurality of decoupling parameters and at least one recoupling parameter based on at least one process output of the plurality of process outputs or at least one controllable input of the plurality of controllable inputs;

an output decoupler, adapted to receive at least two process outputs of the plurality of process outputs and adapted to generate decoupled output signals based on the at least two process outputs and the plurality of decoupling parameters;

a tunable controller, adapted to receive the decoupled output signals, the tunable controller comprising a plurality of tuners, each of which tunes a control system formed between one of the decoupled output signals and a decoupled controllable input signal output by the tunable controller which is controlled according to a set of one or more control targets; and an input recoupler, adapted to receive the decoupled controllable input signals from the tunable controller and the plurality of recoupling parameters from the parameter calculator, wherein the input recoupler is further adapted to transform the decoupled controllable input signals according to the at least one recoupling parameter into the one or more of the plurality of controllable inputs being manipulated.

2. The controller of claim 1, wherein the decoupling parameters are an indication of a dynamic process model.

3. The controller of claim 1, further comprising a control design engine which adapts to process variations through successive identification tests or which schedules the decoupling parameters and controller gains as a function of at least one of the plurality of process outputs.

4. The controller of claim 1, further comprising a control design engine, wherein the decoupling parameters include transformations which transform a coupled multi-variable control loop into a plurality of decoupled single-input single-output loops.

5. The controller of claim 1, wherein the plurality of decoupling parameters are decoupling parameters obtained through a Singular Value Decomposition on DC gain values determined from an identified dynamic process model.

6. The controller of claim 1, wherein said tunable controller further comprises means for individual channel tuning of each of the plurality of tuners.

7. The controller of claim 1, wherein said tunable controller further comprises means for ganged channel tuning of each of the plurality of tuners.

8. The controller of claim 1, wherein said tunable controller further comprises means for tuning based on a single scalar entity.

9. A controller as set forth in claim 8, wherein the tuning based on a single scalar entity uses Singular Value Decomposition on DC gain values as well as a plurality of process time constants obtained from an identified dynamic process model.

10. A controller as set forth in claim 1, wherein the controller is a controller which does not constrain its control synthesis to a particular control synthesis technique.

11. A controller as set forth in claim 1, wherein the tunable controller controls the at least two process outputs as decoupled output signals and controls at least two others of the plurality of process outputs as coupled output signals.

12. A controller as set forth in claim 1, wherein the tunable controller controls each of the tuners is a Proportional plus Integral (PI) controller, a Proportional plus Derivative (PD) controller or a Proportional plus Integral plus Derivative (PID) controller.

13. A controller for controlling a plurality of controllable inputs to a dynamic process where the plurality of controllable inputs affect a plurality of process outputs of the dynamic process and control of the plurality of process outputs is achieved by manipulating one or more of the plurality of controllable inputs to the dynamic process, the controller comprising:

a parameter calculator which calculates a plurality of recoupling parameters and is adapted to receive at least one process output of the plurality of process outputs or at least one controllable input of the plurality of controllable inputs;

a tunable controller, adapted to receive at least two process outputs of the plurality of process outputs, the tunable controller comprising a plurality of tuners, each of which tunes a control system formed between one process output from one of the plurality of process outputs and a decoupled controllable input signal output by the tunable controller which is controlled according to a set of one or more control targets; and an input recoupler, adapted to receive the decoupled controllable input signals from the tunable controller and the plurality of recoupling parameters from the parameter calculator, wherein the input recoupler is adapted to transform the decoupled controllable input signals according to the plurality of recoupling parameters into the one or more of the plurality of controllable inputs being manipulated.

14. A method of decoupling a plurality of process outputs of a dynamic process from a plurality of process inputs to the dynamic process, comprising the steps of:

measuring responses of the dynamic process to test signals to determine a dynamic process model for the dynamic process;

generating an output transformation matrix, a tuning matrix and an input transformation matrix from the dynamic process model;

transforming signals from the plurality of process outputs through the output transformation matrix to form a plurality of decoupled process output signals;

transforming the plurality of decoupled process output signals according to the tuning matrix and independent controls of at least one of the plurality of decoupled process output signals to form a plurality of decoupled process input signals;

transforming the plurality of decoupled process input signals through the input transformation matrix to form a plurality of recoupled process input signals; and applying the plurality of recoupled process input signals to the process inputs of the dynamic process;

wherein the output transformation matrix, tuning matrix and input transformation matrix are such that the input/output map of the plurality of decoupled process input signals to the plurality of decoupled process output signals is decoupled relative to the dynamic process, thereby converting the dynamic process from a multivariable control system into a plurality of single-input single-output control systems.

15. The method of claim 14, wherein the output transformation matrix is an identity matrix.

16. The method of claim 14, wherein the step of measuring comprises the steps of:

applying an input step signal to each of the process inputs;

detecting an effect of the input step signals;

applying an output step signal for each of the process outputs, prior to the step of transforming according to the tuning matrix;

detecting an effect of the output step signals; and generating a dynamic process model based on the effects detected in the steps of detecting.

17. The method of claim 14, wherein the dynamic process model is a function of at least one of a gain, a time constant, a delay, a variable gain, a variable time constant, and a variable delay.

18. The method of claim 14, wherein the dynamic process model is a model of a nonlinear dynamic process.

* * * * *